US012695337B2

(12) United States Patent
Leboeuf et al.

(10) Patent No.: US 12,695,337 B2
(45) Date of Patent: Jul. 28, 2026

(54) SYNCHRONOUS ELECTRICAL MACHINE, AND ASSOCIATED PROPULSION ORIENTED DRIVE DEVICE, BOAT, AND METHOD FOR COOLING SUCH A MACHINE

(71) Applicant: GE ENERGY POWER CONVERSION TECHNOLOGY LIMITED, Warwicksire (GB)

(72) Inventors: Nicolas Leboeuf, Champigneulles (FR); Lionel Julliand, Belfort (FR); Theo Grall, Belfort (FR)

(73) Assignee: GE ENERGY POWER CONVERSION TECHNOLOGY LIMITED, Warwicksire (GB)

( * ) Notice: Subject to any disclaimer, the term of this patent is extended or adjusted under 35 U.S.C. 154(b) by 141 days.

(21) Appl. No.: 18/319,341

(22) Filed: May 17, 2023

(65) Prior Publication Data

US 2023/0412013 A1     Dec. 21, 2023

(30) Foreign Application Priority Data

May 17, 2022     (EP) ..................................... 22173683

(51) Int. Cl.
| | |
|---|---|
| *H02K 1/20* | (2006.01) |
| *B63H 21/17* | (2006.01) |
| *B63H 21/38* | (2006.01) |

(52) U.S. Cl.
CPC .............. *H02K 1/20* (2013.01); *B63H 21/17* (2013.01); *B63H 21/383* (2013.01)

(58) Field of Classification Search
CPC ............ H02K 1/20; H02K 5/20; H02K 5/203; H02K 5/207; H02K 9/10; H02K 9/12
See application file for complete search history.

(56) References Cited

U.S. PATENT DOCUMENTS 831,625 A * 9/1906 McElroy .................. H02K 1/20
310/65
2,714,886 A 8/1955 Castelo
(Continued)

FOREIGN PATENT DOCUMENTS

| | | |
|---|---|---|
| CN | 106687369 A | 5/2017 |
| CN | 107074338 B | 3/2020 |

(Continued)

OTHER PUBLICATIONS

WO 2006086816 A1 translation (Year: 2006).*

(Continued)

*Primary Examiner* — Oluseye Iwarere
*Assistant Examiner* — Nicholas Lee Setzer
(74) *Attorney, Agent, or Firm* — Wood IP LLC; Theodore A. Wood

(57) ABSTRACT

Provided is a synchronous electrical machine that includes a machine housing having a stator and a rotor lodged in the stator, the rotor being separated from the stator by an airgap, and the machine housing dissipating thermal losses generated by the stator. The stator having stacks of laminations and at least one channel extending along a longitudinal direction of the stator and formed in the laminations, two adjacent stacks of laminations being separated by pins or spacers to form an extraction duct connected to the channel, the machine housing further having an extraction opening so that a fluid injected in the air gap at the ends of the stator flows in the extraction duct and in the channel, and is extracted from the machine through the opening to cool the stator and the rotor.

8 Claims, 4 Drawing Sheets

(56) References Cited

U.S. PATENT DOCUMENTS

| | | | |
|---|---|---|---|
| 6,485,339 B1 | 11/2002 | Hartig et al. | |
| 7,018,249 B2 | 3/2006 | Ries et al. | |
| 10,759,511 B2 | 9/2020 | Mudupu et al. | |
| 2004/0175998 A1 | 9/2004 | Lonngren | |
| 2005/0009418 A1 | 1/2005 | Ries et al. | |
| 2007/0024129 A1* | 2/2007 | Pfannschmidt | H02K 1/20 |
| | | | 310/59 |
| 2011/0127862 A1* | 6/2011 | Eichinger | H02K 3/24 |
| | | | 310/61 |
| 2015/0288233 A1* | 10/2015 | Kim | H02K 1/2766 |
| | | | 310/156.01 |
| 2017/0214295 A1 | 7/2017 | Jadrijevic | |
| 2019/0074755 A1* | 3/2019 | Galmiche | H02K 1/32 |
| 2021/0211000 A1* | 7/2021 | Velly | H02K 1/20 |
| 2023/0234687 A1 | 7/2023 | Julliand et al. | |
| 2023/0234691 A1 | 7/2023 | Julliand et al. | |

FOREIGN PATENT DOCUMENTS

| | | | | | |
|---|---|---|---|---|---|
| CN | 210793600 U | 6/2020 | | | |
| CN | 212861833 U | 4/2021 | | | |
| DE | 10307813 A1 | 9/2004 | | | |
| EP | 2876039 A1 | 5/2015 | | | |
| EP | 1614205 B1 | 3/2017 | | | |
| JP | H1162580 A | 3/1999 | | | |
| KR | 100351342 B1 | 2/2003 | | | |
| KR | 101628357 B1 | 6/2016 | | | |
| KR | 20170002511 A | 1/2017 | | | |
| PT | 1625071 E | 6/2013 | | | |
| WO | 9749605 A1 | 12/1997 | | | |
| WO | 9905024 A1 | 2/1999 | | | |
| WO | WO-2006086816 A1 * | 8/2006 | | H02K 1/12 | |
| WO | 2018059844 A1 | 4/2018 | | | |

OTHER PUBLICATIONS

Chaithongsuk "Optimisation de structure de machines à aimants permanents basée sur l'analyse spectrale de l'induction d'entrefer en vue de l'entrainement à vitesse variable dans les systèmes embarqués," May 20, 2011, Institut National Polytechnique de Lorraine, 150 pages. (English Abstract Only).

Zhao et al. "Optimal Design of a Novel V type IPM Motor with Assisted Barriers for the Improvement of Torque Characteristics," IEEE Transactions on Magnetics, vol. 50, No. 11, Sep. 2014, Wisconsin Electric Machines & Power Electronics Consortium, 5 pages.

"Azipod® Electric Propulsion." ABB Marine Ports, ABB Asea Brown Boveri Ltd, 2023, https://new.abb.com/marine/systems-and-solutions/azipod, 13 pages.

Drouen "Machines électriques intégrées à des hélices marines: contribution à une modélisation et conception mutli-physique," Energie electrique, Arts et Metiers ParisTech, 2010, Francais, NNT: 2010ENAM0053, pastel-00550890, 251 pages. (Electrical machines integrated into marine propellers: contribution to multi physics modeling and design—English Abstract Only).

European Search Report for EP Application No. 22173683.8 dated Nov. 4, 2022, 11 pages.

Filliau et al. "Le Navire Tout Electrique—Propulsion et Production d'Énergie," Technique de l'ingénieur D5610/5615/5620. (The all-electric ship—Propulsion and energy production—English Abstract Only).

Lateb "Modélisation des machines asynchrones et synchrones à aimants avec prise en compte des harmoniques d'espace et de temps: application à la propulsion marine par POD," Oct. 19, 2006, Institut National Polytechnique de Lorraine. (Modeling of asynchronous and synchronous machines with magnets considering the space and time harmonics: application to marine propulsion POD—English Abstract Only).

Mouty "Conception de machines à aimants permanents à haute densité de couple pour les éoliennes de forte puissances," May 30, 2013, Université de Franche Comté. (Design of high torque density permanent magnet machines for high power wind turbines—English Abstract Only).

Zhao, et al. "Optimal Design of a Novel V type IPM Motor with Assisted Barriers for the Improvement of Torque Characteristics," IEEE Transactions on Magnetics, vol. 50, No. 11, Sep. 2014, Wisconsin Electric Machines & Power Electronics Consortium. (Abstract Only).

* cited by examiner (M)

SYNCHRONOUS ELECTRICAL MACHINE, AND ASSOCIATED PROPULSION ORIENTED DRIVE DEVICE, BOAT, AND METHOD FOR COOLING SUCH A MACHINE

I. CROSS-REFERENCE TO RELATED APPLICATIONS

This application claims priority to European Patent Application Serial Number 22173683.8, filed May 17, 2022, which is herein incorporated by reference.

II. FIELD OF THE INVENTION

The present invention concerns electrical rotating machines and relates more particularly to a synchronous electrical machine.

The present invention also relates to a propulsion-oriented drive device POD comprising such a synchronous electrical machine and a boat comprising such a POD.

III. BACKGROUND

In this description, "boat" shall mean any type of motorized floating vessel or vehicle designed to be sailed.

A boat comprises an electrical propulsion system comprising generally several PODs generating torques to propel and steer the boat.

Each POD comprises a steering module located in a hull of the boat, a propulsion module submerged in the water, for example the sea, and a strut connecting the steering module to the propulsion module.

The steering module orientates the strut to orientate the propulsion module in order to steer the boat.

Generally, the propulsion module comprises a housing lodging an electrical machine and a propeller driven by the electrical machine.

As the electrical machine generates losses, for example Joule losses, the machine needs to be cooled to be safe and to meet certification standards such as thermal and insulation classes.

It is known from the prior art to form fitting the motor into the housing of the POD to ensure cooling through the wall of the housing and to implement a permanent magnets rotor, the motor being a synchronous permanent magnet motor.

The heat generated by a permanent magnet rotor is reduced compared to a wounded rotor sot that the losses generated by the machine is mainly produced by the stator of the machine.

As the stator of the machine is shrinked into the housing, the amount of losses generated by the stator is conducted by conduction in the housing of the POD and subsequently released into the water through the housing.

The heat exchange surface is limited to a part of the peripheral surface of machine.

In this case, the machine is designed to ensure an optimal cooling of the machine by increasing the diameter of the machine to limit the thermal losses.

Increasing the diameter of the machine increases the volume and the mass of the power module deteriorating the hydrodynamical efficiency of the POD.

Another known solution to cool the machine of the POD is to implement an induction motor in the propulsion module to drive the propeller.

The induction motor is cooled by a forced air-cooling system comprising ducts injecting cooled air at each end of the motor in an air gap between the stator and the rotor to cool the machine, and an opening generally in the middle of the stator so that the injected cooled air warmed up by the stator and the rotor thermal losses escapes the machine through the openings. The stator is not shrinked into the housing in order to allow the air extraction from the stator preventing any exchanges with sea water by conduction.

However, the induction motor has a low efficiency and requires therefore high-power power converters due to lower power factor and bigger cooling unit.

The high-power power converters driving the induction motor are larger than power converters driving a synchronous motor.

As the space reserved to the power converters is limited, the power converters need to be reduced.

It is also known from the prior art to implement a synchronous machine comprising a wounded rotor in the propulsion module.

This latter can be implemented in the same way as the induction motor as explained before.

Alternatively, the synchronous machine can be shrinked into the housing to ensure cooling through the wall as described above.

The propulsion module further comprises a forced air axial cooling system comprising a first duct injecting cooled air at one end of the stator in an air gap between the stator and the rotor, and a second duct at the other end of the stator collecting the cooled air warmed up by the stator and the rotor thermal losses. Additional cooling channels are often used to improve the cooling around the stator slots.

As the injected cooled air flows through the totality of the machine, hot spots appear in the machine, generally at the other end of the stator deteriorating the efficiency of the cooling itself.

It is therefore proposed to remedy the disadvantages related to the cooling of electrical machines according to the prior art.

IV. BRIEF SUMMARY OF THE INVENTION

In view of the foregoing the invention proposes a synchronous electrical machine comprising a machine housing including a stator and a rotor lodged in the stator, the rotor being separated from the stator by an airgap, the machine housing being configured to dissipate thermal losses generated by the stator.

The stator comprises stacks of laminations and at least one channel extending along a longitudinal direction of the stator and formed in the laminations, two adjacent stacks of laminations being separated by spacers or pins to form an extraction duct connected to the channel, the machine housing further comprising an extraction opening so that a fluid injected in the air gap at the ends of the stator flows in the extraction duct and in the channel, and is extracted from the machine through the opening to cool the stator and the rotor.

Advantageously, the stator comprises a plurality of tie rods passing through the stacks of laminations and evenly distributed along a diameter of the stator to maintain the stacks of lamination compacted, the channel being disposed on the said diameter.

Preferably, the stator comprises a plurality of channels evenly distributed along the said diameter, at least one channel being interposed between two tie rods.

Advantageously, the tie rods are made of non-magnetic material. Preferably, the rotor comprises permanent magnets.

Advantageously, the permanent magnets are arranged in U or V shapes.

These arrangements minimize the volume of the permanent magnets for a given torque.

The magnets may be grouped to form magnet poles and may be assemble/disassembled separately by means of keybars, dovetails or screws.

Alternatively, the rotor comprises a plurality of magnetic rotor poles cores evenly distributed around the rotor and rotor coils, each rotor coil being wounded around a different magnetic rotor pole core, the said machine comprising supply means to fed the rotor coils.

The rotor poles cores may be mounted on a rotor rim of the rotor so that they may be assembled/disassembled separately by means of keybars, dovetails or screws.

Another object of the invention relates to a propulsion oriented drive device for a boat comprising a propulsion module intended to be submerged in another fluid and a synchronous electrical machine as defined above, the machine housing being inserted in a casing of the propulsion module so that the thermal losses generated by the machine is transferred to the casing and evacuated in the other fluid, the propulsion oriented drive device further comprising cooling means to cool the machine with the fluid, the cooling means comprising injecting means to inject the fluid in the air gap at each ends of the stator and evacuation means connected to the extraction opening so that the fluid heated by the machine escapes the machine.

Advantageously, the supply means comprising at least one supply pipe connecting the ends of the machine and configured to supply the fluid, and the evacuation means comprise an evacuation pipe connected to the evacuation opening.

Another object of the invention relates to a boat comprising a hull and a propulsion oriented drive device as defined above, and a cooling fluid unit configured to cool the fluid flowing through the evacuation means and configured to feed the injecting means with cooled fluid.

Preferably, the cooling fluid unit is located in the casing.

Another object of the invention relates to a method for cooling a synchronous electrical machine comprising a machine housing including a stator and a rotor lodged in the stator, the rotor being separated from the stator by an airgap, the stator comprises stacks of laminations and at least one channel extending along a longitudinal direction of the stator and formed in the laminations, two adjacent stacks of laminations being separated by pins or spacers to form an extraction duct connected to the channel, the machine housing further comprising an extraction opening, the method comprising:

injecting a fluid in the airgap at the ends of the stator so that the fluid flows in the extraction duct and in the channel, and is extracted from the machine through the opening to cool the stator, and transferring the thermal losses conducted by the machine housing to another fluid.

V. BRIEF DESCRIPTION OF THE DRAWINGS

Other characteristics and advantages of the invention will emerge on reading the following description of embodiments of the invention, provided solely by way of non-limiting examples and with reference to the drawings in which.

VI. DETAILED DESCRIPTION OF THE INVENTION

Figure 1:
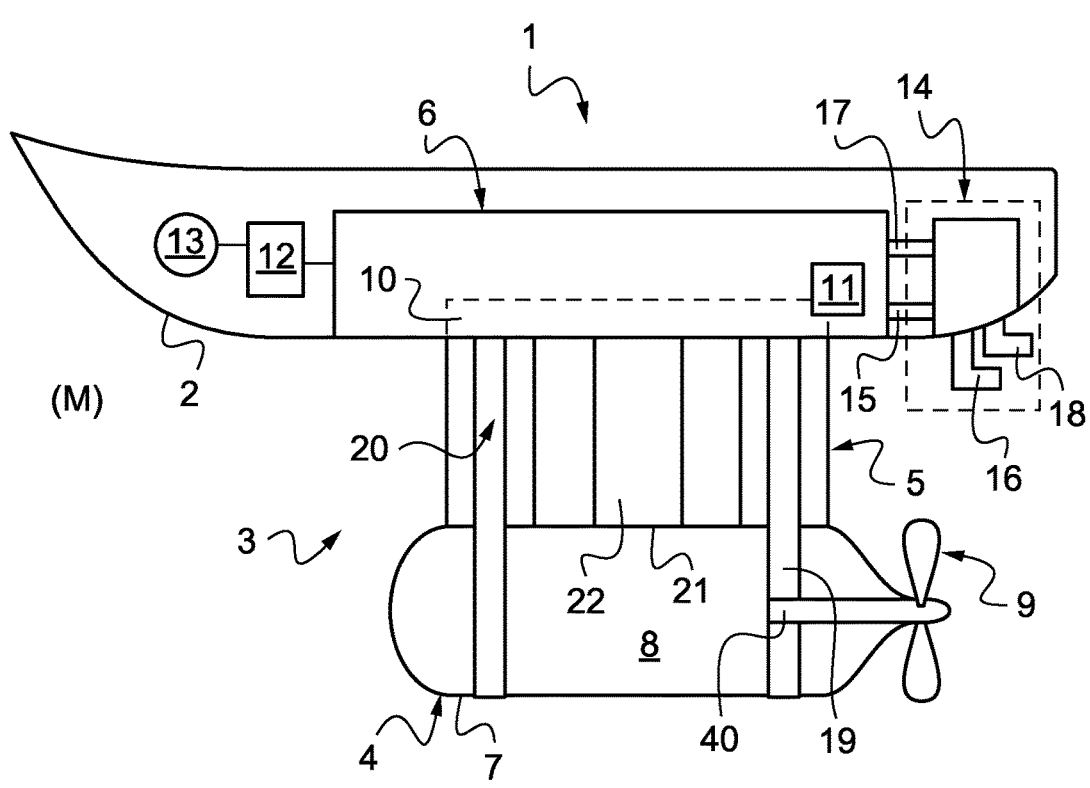
FIG. 1 illustrates an example of a boat according to the invention.

FIG. 1 illustrates an example of a boat 1 comprising a hull 2 and a propulsion-oriented drive device 3 (POD).

The POD 3 comprises a propulsion module 4, a strut 5 or POD leg, and a steering module 6.

The module 4 and the strut 5 are submerged in a first fluid, for example water of the sea (M), and the steering module 6 is lodged in the hull 2.

A first end of the strut 5 is connected to the propulsion module 4 and the second end of the strut 5 is connected to the steering module 6.

The propulsion module 4 comprises a casing 7, a synchronous electrical machine 8 and a propeller 9 connected to a rotor shaft 40 of the machine 8.

The machine 8 drives the propeller 9.

The steering module 6 comprises a pivoting link 10 connected to the strut 5 and a drive device 11 to orient the strut 5, thereby changing the propulsion direction of the propeller 9.

The synchronous electrical machine 8 is inserted in the casing 7, for example by shrinking, so that a machine housing of the machine 8 is in contact with the casing.

The heat generated by the electrical machine 8 is transferred to the casing 7 by heat conduction to ensure cooling through the wall of the casing 7.

The amount of heat generated by the machine 8 is conducted to the casing 7 and subsequently released into the water through the casing 7.

Figure 3:
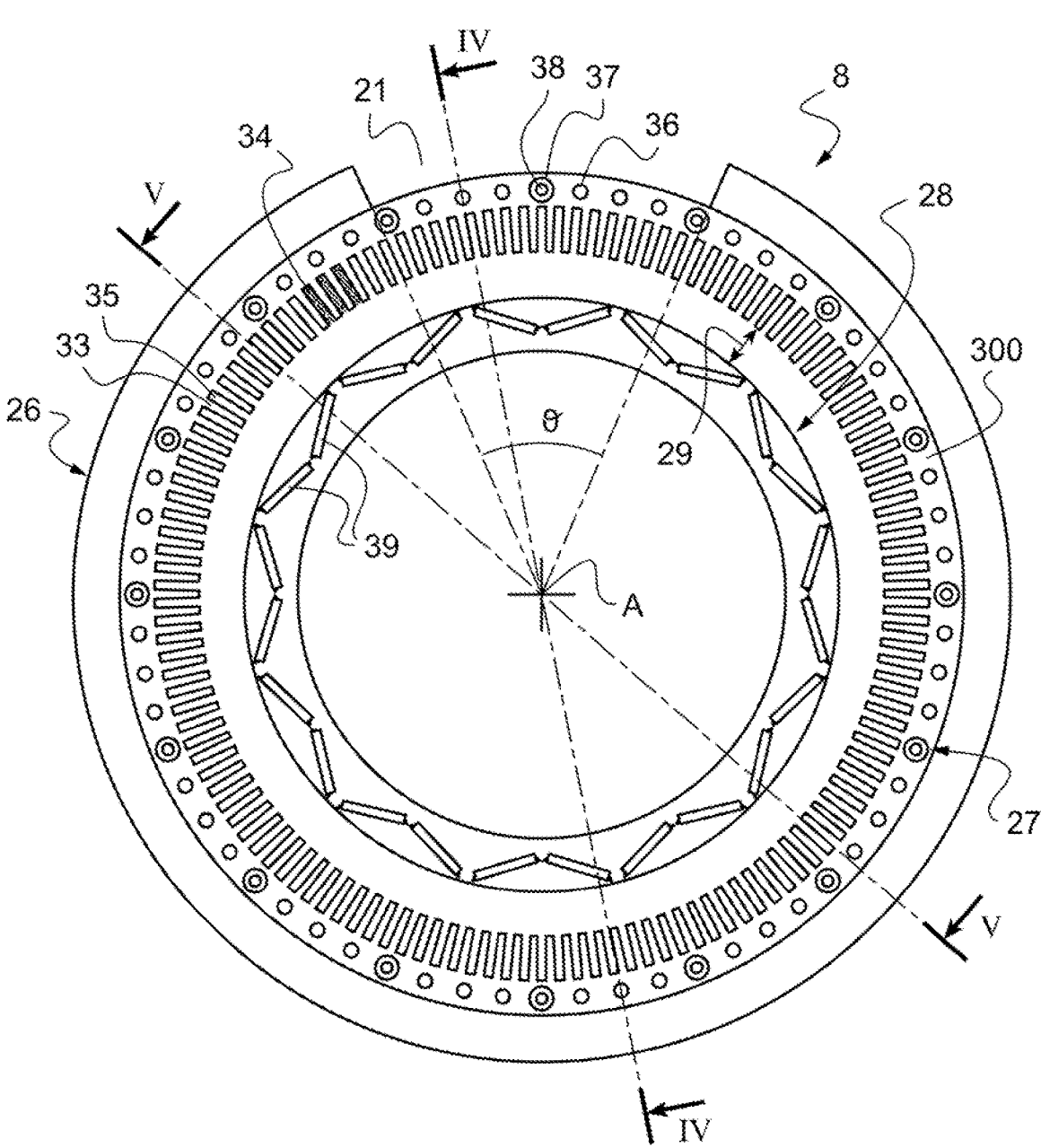
FIGS. 3, 4 and 5 illustrate an example of the synchronous electrical machine according to the invention.
Figures 4, 5:
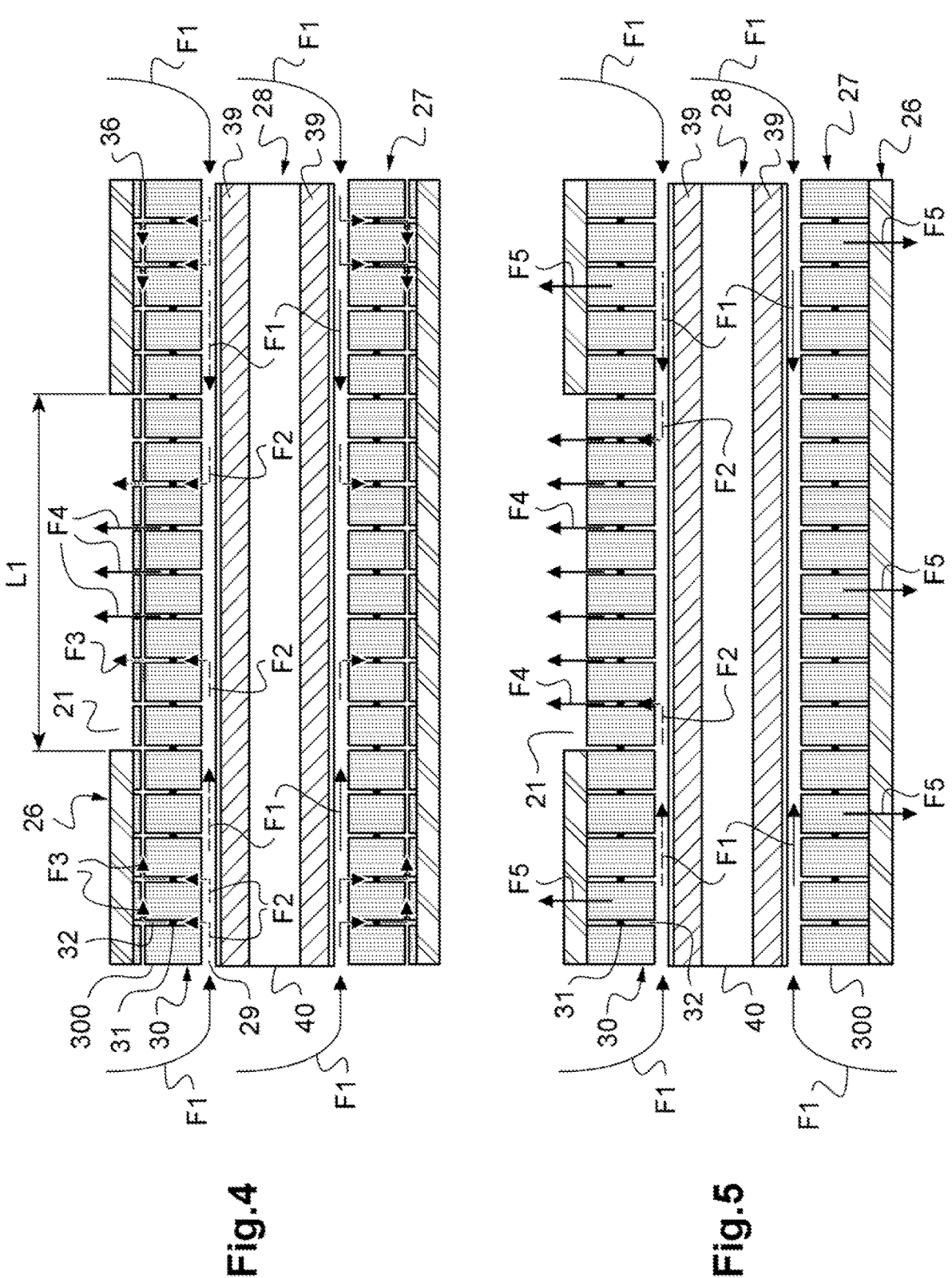

The thermal losses generated by the machine comprises the thermal losses generated by a stator of the machine 8 and a rotor of the machine 8 (the stator and the rotor are represented on FIGS. 3, 4 and 5).

The POD 3 further comprises cooling means to cool the machine 8 with a second fluid.

The second fluid comprises for example air, water, oil, or a gas such as methane or azote.

The boat 1 further comprises a power converter 12 supplying the machine 8 from an electrical network 13 of the boat 1, and a cooling fluid unit 14 to cool the second fluid.

The cooling fluid unit 14 comprises a first input 15, a second input 16, a first output 17 and a second output 18.

The first input 15 and the first output 17 are connected to the steering module 6, the second input 16 and the second output 18 are submerged in water.

The cooling means comprise injecting means injecting at each end of the stator the second fluid in an air gap between the stator and the rotor of the machine 8 and evacuation means connected to an extraction opening 21 of the machine 8 so that the second fluid heated by the machine 8 escapes the machine 8 through the extraction opening 21.

The injecting means comprise two supply pipes 19, 20, each pipe 19, 20 being connected at one different end of the machine 8 and to the first output 17 through the steering module 6.

The supply pipes 19, 20 inject cooled second fluid in the air gap of the machine 8, the cooled second fluid being delivered by the cooling fluid unit 14.

In another embodiment, the supply means comprise one supply pipe or more than two supply pipes suppling the two ends of the machine 8.

The evacuation means comprise an evacuation pipe 22 connecting the evacuation opening 21 to the first input 15 of the cooling fluid unit 14 through the steering module 6.

The cooling fluid unit 14 cools the second fluid flowing through the evacuation means and feed the injecting means with cooled second fluid.

Figure 2:
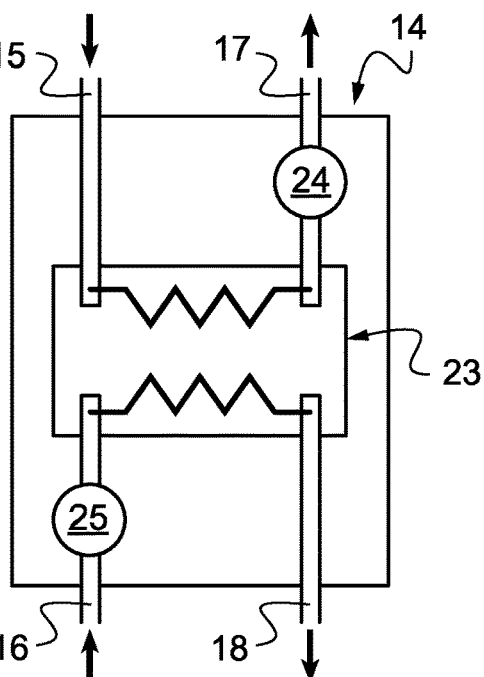
FIG. 2 illustrates an example of cooling fluid unit according to the invention.

FIG. 2 illustrates an example of the cooling fluid unit 14.

The cooling fluid unit 14 comprises a heat exchanger 23 comprising a first circuit and a second circuit.

The first circuit comprises the first input 15, the first output 17, and a first pump 24.

The second circuit comprises the second input 16, the second output 18, and a second pump 25.

The first pump 24 sucks the second fluid at the first input 15 and the second pump 25 sucks water from the sea (M) through the second input 16 so that the second fluid flowing in the first circuit of the exchanger 23 is cooled by the water flowing in the second circuit of the exchanger 23.

The cooled second fluid is delivered by the first pump 24 at the first output 17.

The heated water is delivered by the second pump 25 at the second output 18.

FIGS. 3, 4 and 5 illustrate a radial and two axial cross sections of an example of the synchronous electrical machine 8.

The machine 8 comprises the machine housing referenced 26 including the stator 27 and the rotor 28 lodged in the stator 27.

The machine housing 26 comprises the evacuation opening 21 defined in a circumferential direction by an angle θ, and having a length L1 in the longitudinal direction A. The angle θ and the length L1 are defined in order to meet criterion of space and mechanical stress constraints to lodge the supply pipes 19, 20 and the evacuation pipe 22 in the strut 5.

The machine housing 26 is made of a material having a high thermal conductivity coefficient, for example more than 50 W/m/K.

The evacuation opening 21 may be disposed in the machine housing 26 so that the evacuation opening 21 is centered in the middle of the stator 27.

The rotor 28 is separated from the stator 27 by the airgap referenced 29.

The stator 27 comprises stacks 30 of laminations 300 separated by spacers or pins 31 forming extraction ducts 32.

The laminations 30 may be made of magnetic steel, two adjacent laminations 30 in contact being separated by an electrical insulator.

Each lamination 30 comprises a plurality of teeth 33.

The stator 27 further comprises a plurality of coils 34.

Each coil 34 is inserted in a slot 35 of the stator 27 formed by two adjacent teeth 33 and extending along a longitudinal direction A of the stator 27.

The coils 34 are connected in the stator 27 to form a plurality of phases, supplied by the power converter 12, each phase comprises an identical number of coils 34.

The stator 27 further comprises a plurality of channels 36 formed in the laminations 30, extending along the longitudinal direction A of the stator 27 and evenly distributed along a first diameter of the stator 27.

Each channel 36 is connected with the ducts 32 so that the second fluid flows from the ducts 32 to a channel 36.

The supply pipes 19, 20 inject the cooled second fluid in the air gap 29 (arrows F1).

The second fluid flows in the ducts 32 (arrows F2) and then in the channels 36 (arrows F3).

The second fluid is extracted from the machine 8 through the evacuation opening 21 (arrows F4).

The second fluid flowing in the air gap 29, in the ducts 32 and the channels 36 is heated by a first part of the thermal losses to cool the stator 27.

The two pipes 19, 20, the ducts 32, the channels 36 and the opening 21 form a bilateral cooling system.

The bilateral cooling system permits to avoid hot spots in the machine 8 to enhance the cooling of the stator 27 compared to a forced air axial cooling system. Therefore, the size of the machine can be reduced.

Further, as the machine housing 26 conducts the heat, a second part of the thermal losses is evacuated in the sea water by conduction (arrows F5).

The first part may be sixty percent of the thermal losses and the second part may be forty percent of the thermal losses.

The combination of a bilateral cooling system and the cooling of the stator 27 by conduction permits to subsequently increase the torque density of the machine 8 by enhancing the cooling of the machine 8.

Therefore, the volume of the machine 8 and thus the volume of the propulsion module 4 is significantly reduced.

Consequently, the hydrodynamical efficiency of the POD is improved compared to a POD known of the prior art delivering the same torque.

Even if the efficiency of the machine may be reduced compared to some existing solutions known from the prior art, the global efficiency of the propulsion system is maintained as the gain of hydrodynamical efficiency compensates the electrical machine efficiency loss.

The efficiency of the machine 8 is equal to the mechanical power generated on a shaft of the rotor by the active electrical power feeding the machine.

Alternatively, as the cooling of the machine 8 is enhanced and for a given efficiency of the machine, the size of the cooling fluid unit 14 is reduced compared to a propulsion system known from the prior art.

The stator 27 further comprises holes 37 in the laminations 30 evenly distributed along a second diameter of the stator 27 lodging tie rods 38 connecting together two compaction plates (not represented) located at the ends of the stator 27 to maintain compacted the laminations 30.

The tie rods 38 may be made of non-magnetic material to limit the Eddy-current losses.

The first diameter and the second diameter may be identical so that the channels 36 and the holes 37 are evenly distributed along the first diameter of the stator 27 in order to minimize the reluctance effects in the stator yoke of the stator 27.

The channels 36 and the holes 37 are arranged in the lamination 30 to optimize the cooling of the stator 27 and so that the compression force is uniformly distributed on the laminations 30.

As illustrated on FIG. 3, the stator 27 comprises forty-eight channels 36 and sixteen holes 37 distributed according to the first diameter so that two holes 37 are separated by three channels 36.

The stator 27 may comprise more or less than forty-eight channels 36 and sixteen holes 37.

The channels 36 and the holes 37 may be arranged differently. The rotor 28 comprises permanent magnets 39.

The permanent magnets 39 may be arranged in V or U shapes to minimize the volume of the magnets 39 for a given torque.

In a variant, the permanent magnets 39 may have another shape.

The implementation of permanent magnets in the rotor 28 permits to limit the thermal losses of the rotor 28 and simplify the design of the machine 8 as the rotor 28 is not supplied by an electrical source.

Figure 6:
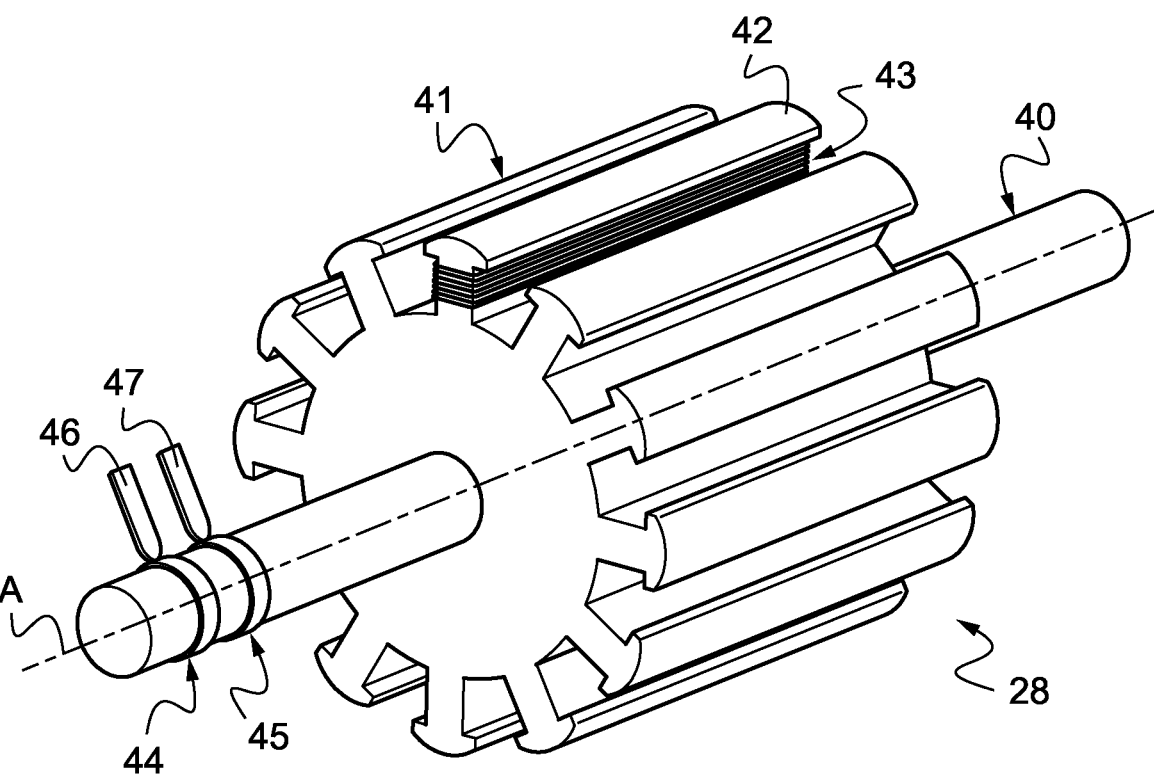
FIG. 6 illustrates another example of a rotor of the synchronous electrical machine according to the invention.

FIG. 6 illustrates a view of another example of the rotor 28.

The rotor 28 comprises the rotor shaft 40 and a magnetic mass 41.

The magnetic mass 41 is made of magnetic laminations and comprises a plurality of magnetic rotor pole cores 42 evenly distributed around the rotor and rotor coils 43.

Each rotor coil 43 is wounded around a different magnetic rotor pole core 42, the rotor pole core 42 and the associated coil 43 forming a rotor pole.

The converter 12 comprises supply means to supply the rotor coils 43 with a continuous voltage.

The supply means may comprise a first slip ring 44 and a second slip ring 45 on the rotor shaft 40, and the stator 26 comprises a first brush 46 in contact with the first slip ring 44 and a second brush 47 in contact with the second slip ring 45, the first brush 44 and the second brush 45 being respectively supplied by the converter 12. Alternatively, the rotor coils can be supplied by an exciter.

The machine 8 may be implemented for other applications than in POD, for example inboard propulsion systems, large sized pumps or large generators.

Figure 7:
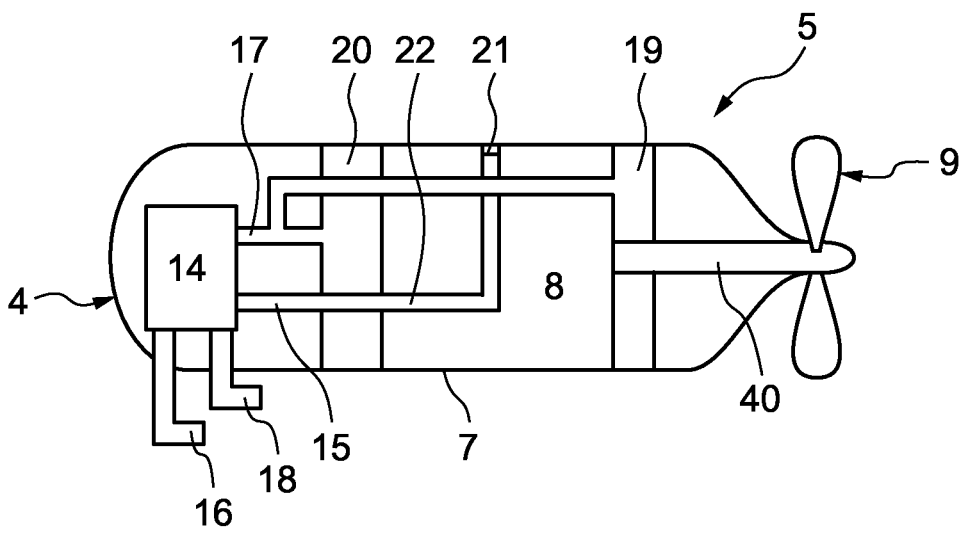
FIG. 7 illustrates an example of a POD.

In another embodiment, represented on FIG. 7, the cooling fluid unit 14 is located in the casing 7 of the POD.

The invention claimed is:

1. A synchronous electrical machine comprising:
a machine housing including:
a stator and a rotor lodged in the stator, the rotor (i) being separated from the stator by an airgap and (ii) made of individual poles obtained with either magnet blocks or wounded coils, the stator comprising stacks of laminations and at least one channel extending along a longitudinal direction of the stator and formed in the laminations, two adjacent stacks of laminations being separated by pins or specific spacers to form an extraction duct connected to the channel; and
an extraction opening so that a fluid being (i) cooled and delivered via a cooling fluid unit and (ii) injected in the air gap at the ends of the stator flows in the extraction duct and in the channel, and is extracted from the machine through the extraction opening to cool the stator and the rotor; and
wherein an entire circumference of the stator is in direct contact with the machine housing, the machine housing surrounding the stator in such a manner that there is no air layer between the stator and the machine housing, thereby allowing an efficient thermal exchange by conduction with a liquid surrounding the housing without compromising the air circulation inside the machine.

2. The synchronous electrical machine according to claim 1, wherein the stator comprises a plurality of tie rods passing through the stacks of laminations and evenly distributed along a diameter of the stator to maintain the stacks of lamination compacted, the channel being disposed on the said diameter.

3. The synchronous electrical machine according to claim 2, wherein the stator comprises a plurality of channels evenly distributed along the said diameter, at least one channel being interposed between two tie rods.

4. The synchronous electrical machine according to claim 2, wherein the tie rods are made of non-magnetic material.

5. The synchronous electrical machine according to claim 1, wherein the rotor comprises permanent magnets.

6. The synchronous electrical machine according to claim 4, wherein the rotor comprises permanent magnets.

7. The synchronous electrical machine according to claim 6, wherein the permanent magnets are arranged in U or V shapes.

8. The synchronous electrical machine according to claim 1, wherein the rotor comprises a plurality of magnetic rotor pole cores evenly distributed around the rotor and rotor coils, each rotor coil being wounded around a different magnetic rotor pole core, the said machine comprising supply means to fed the rotor coils.

* * * * *